United States Patent [19]
Takada et al.

[11] 3,885,087
[45] May 20, 1975

[54] AIR TIGHT, RESIN FILLED CONNECTION POINT FOR COMMUNICATION CABLES

[75] Inventors: Toshihisa Takada; Yukio Matsui, both of Tokyo, Japan

[73] Assignee: Fujikura Cable Works, Ltd., Tokyo, Japan

[22] Filed: July 17, 1973

[21] Appl. No.: 380,025

[52] U.S. Cl. .................... 174/93; 174/22; 174/76; 264/261
[51] Int. Cl. .................. H02g 15/24; H02g 15/08
[58] Field of Search .... 174/22 R, 22 C, 23 R, 21 R, 174/76, 91–93; 29/628

[56] References Cited
UNITED STATES PATENTS

| | | | |
|---|---|---|---|
| 3,678,175 | 7/1972 | Appiani et al. | 174/76 X |
| 3,795,758 | 3/1974 | O'Mara | 174/22 R X |

*Primary Examiner*—Darrell L. Clay
*Attorney, Agent, or Firm*—Sughrue, Rothwell, Mion, Zinn & Macpeak

[57] ABSTRACT

In forming an air tight dam at a connecting zone of two communication cables or an opened zone of a cable sheath, slit spring sleeves capable of compressing the sheath and the insulated conductor body are inserted in an outer sleeve which covers the connecting zone or the opened zone of the sheath. The slit spring sleeves are first inserted into the outer sleeve while maintained in the enlarged state. A room-temperature setting resin exhibiting rubber-like elasticity after setting is poured to fill the slit spring sleeves and to set therein. Then, the means for enlarging the slit spring sleeves is released to compress the interior of the dam.

7 Claims, 10 Drawing Figures

ELASTIC RESIN

FIG.1
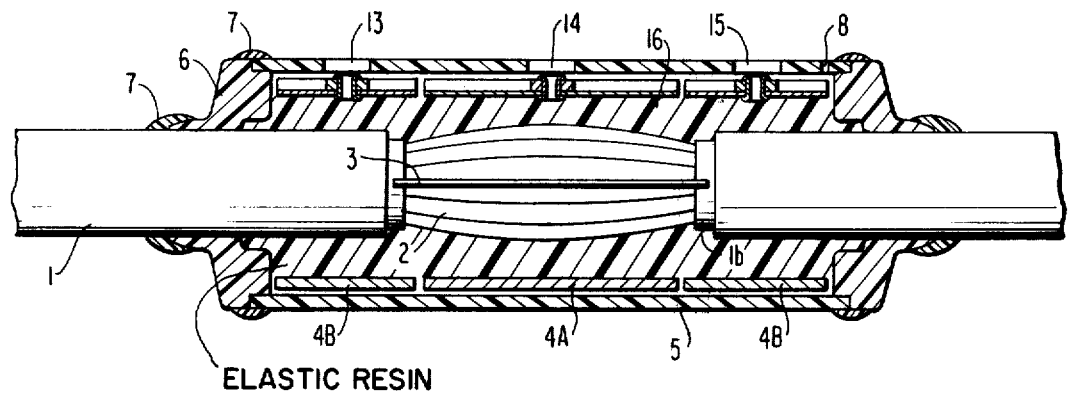
ELASTIC RESIN
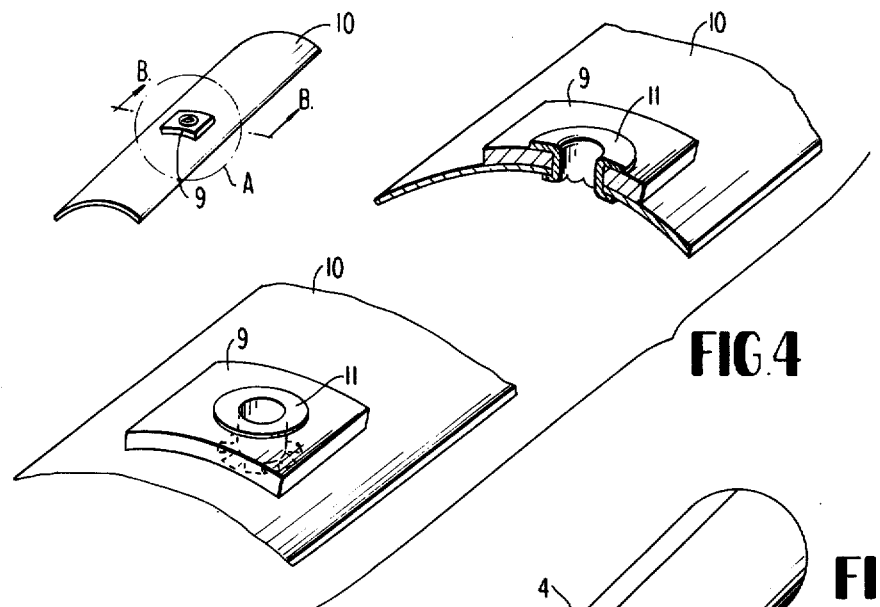
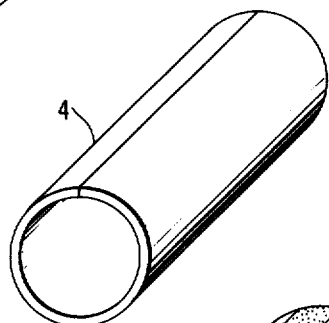
FIG.4
FIG.2
FIG.3
FIG.5

AIR TIGHT RESIN FILLED CONNECTION POINT DAM FOR COMMUNICATION CABLES

BACKGROUND OF THE INVENTION

1. Field of the Invention

This invention relates to an air tight dam in a plastic insulated communication cable line, more particularly, to a method of forming an air tight dam at a connection between an underground cable filled with compressed gas and an aerial cable which is not filled with compressed gas, or at some median point in a long underground cable so as to separate the sealed gas in the cable, each being independent of each other.

2. Description of the Prior Art

The interior of an underground communication cable is usually filled with dry air, nitrogen gas or a similar chemically inert gas presssurized to about 600 g/cm² (gauge pressure; hereinafter simply G), to prevent the rapid penetration of the moisture into the cable, even when the outer sheath of the cable is damaged, and to facilitate the detection of damaged parts of the cable.

In order to prevent the flow of the sealed compressed gas through a connecting zone between a cable filled with compressed gas and a cable not filled with compressed gas, an air tight dam is provided for the use of the gas plug at the connection zone of such different cables, and where the underground cable is long, the gas filled in the cable is separated into several parts, each independent of each other, by air tight dams for the use of the gas separator in order to supply rapidly enough gas in the case of damage to the sheath to the sheath damage point from close gas supply equipment.

It is the usual practice in this art to form the air tight dam with an epoxy or urethane resin which penetrates well into the insulating paper of such cables and which adheres well to the metallic conductor body of such cables, thus forming a favorable air tight dam.

Polyethylene resins have recently become widely used as an insulating material in such cables due to the favorable insulating properties thereof, but polyethylene resins are chemically stable and adhere poorly to epoxy or urethane resins. Further since the influence of the mutually different thermal expansion coefficients of polyethylene resins and the epoxy or urethane resins and the air tight dam forming materials is enlarged by changes in the environmental temperature, the air tightness of the dam or the adhesion between the polyethylene resin and the epoxy or urethane resins is broken, causing gas leakage.

SUMMARY OF THE INVENTION

This invention is intended to solve the above described problems with conventional methods of forming an air tight dam in communication cable.

According to the improved method of this invention, a rubber-like elastic member is filled into the air tight dam and compressed inwardly to apply a uniform pressure to the interior of the air tight dam, more particularly, a plastic sleeve including therein spring metal sleeves, which have a longitudinal slit running therealong respectively and cover the connecting zone or opened zone of the cable sheath and the cable sheath zones respectively, is provided.

The slit of the spring sleeve is enlarged forcibly by inserting therein small spacer pieces prior to their insertion into the outer sleeve. A plurality of small holes are provided on the outer sleeve at positions corresponding to that of the small spacer pieces so that they can be removed through the small holes after the resin is filled into the air tight dam. One of the small holes serves as a resin pouring hole.

The viscous room-temperature setting resin (room-temperature setting polyurethane resin or the like), which will be converted into the rubber-like elastic and soft mass after setting, is poured through the resin pouring hole into the interior of the outer sleeve, and the poured resin fills the space in the outer sleeve and apertures in the twisted core wires. After setting the resin, the small spacer pieces inserted respectively in the slits of the spring sleeves are removed to thereby cause a contracting force to be applied to the elastic resin.

Thus, the insulated conductors and the cable sheath in the elastic resin have applied thereto by an embracing pressure or compression as if they were tightened by the packing.

In this case, individual spring metal sleeves are provided for the cable sheath zones and for the insulated conductors zone so that the compressive force provided can be invidually controlled (referring to FIG. 1, "side" spring sleeves over the cable sheath zones are shown by numeral 4B and the "central" spring metal sleeve is identified by numeral 4A. While in this case only 3 spring cases are shown, it would be apparent to one skilled in the art that a greater number of spring sleeves can be used, if desired, but that practically speaking for the embodiment shown in FIG. 1 three spring sleeves (2 side and 1 central spring sleeve) are adequate).

By this type of arrangement, an appropriate pressure or compression will be applied individually to the 2 cable sheath zones wherein hardly any bubbles would be trapped in the resin when it is filled, and appropriate pressure would be applied to the insulated conductors zone where it is difficult to fill the resin and bubbles are frequently encountered in the resin. Accordingly, both the problem of lower compression on the hard cable sheath zones at both ends of the air tight dam than the compression on the central conductors zone caused by increased environmental temperature, and the problem of lower compression on the central conductors zone than the compression on the cable sheath zones caused by lowered environmental temperature, can be prevented.

In the case that the air tight dam is exposed to changes in environmental temperature, differences in the thermal expansion coefficient of the cable sheath part and that of the insulated conductor body caused by the difference of the materials used is compensated for by the expansion and contraction of the individual spring sleeves which apply a suitable compression to each of the parts respectively.

As the environmental temperature of the air tight dam increases and the filled resin and the cable expand, the spring sleeves expand respectively to prevent excess compression on the interior of the air tight dam.

On the other hand, as the environmental temperature of the air tight dam decreases and the filled resin and the cable contract, the spring sleeves shrink respectively to further compress the interior of the air tight dam and to maintain air tightness.

The viscous room-temperature setting resin (i.e., a resin which exhibits setting at room temperature) used in the method of this invention has a fluidity which is not as high as that of epoxy resin but which is low enough to flow under its own weight, and penetrates fully into the spaces between the spaces between insulated twisted conductor wires and fills the space in the cable upon the application of a suitable pressure.

After filling in the space in the cable and penetration into the spaces between the twisted conductor wires, the resin flows very slowly due to flow resistance and finally stops flowing upon the release of applied pressure. Accordingly, unfilled spaces do not exist due to further flow of the resin into the spaces before the setting of the resin in the connecting zone.

The viscosity of the resin is preferably 2,000 – 5,000 centipoise, and the rubber like elasticity as measured by the penetration hardness (JIS-K-2530) after setting is preferably 2 – 7 mm/100 g. 5 sec at 25° C. The set resin exhibits a rubberlike elasticity. As such a resin, for example a urethane resin, before setting such is composed of mainly 100 weight parts of a urethane prepolymer and 50 to 120 weight parts, preferably 70 – 90 weight parts of polyoxypropylene glycol (molecular weight 2,000) is suitable.

The spring sleeve is made from spring steel, phosphor copper or a like elastic alloy. The compressive pressure caused inwardly by the spring sleeve is achieved by adjusting the thickness of the spring sleeve between 2 – 6 Kg/cm$^2$, according to the wire number of the cable, 2 Kg/cm$^2$ for the smaller number and 6 Kg/cm$^2$ for the larger number so as to insure pressure even on the wires in the interior.

BRIEF DESCRIPTION OF THE DRAWINGS

FIG. 1 is a longitudinal cross section of an air tight dam according to this invention, FIGS. 2, 8, 9 and 10 show examples of slit spring sleeves to be applied to the air tight dam, FIG. 3 is a perspective view of the slit spring sleeve expanded by a small spacer forcibly inserted in the longitudinal slit, FIG. 4 is a perspective view of the structure of the small spacer, FIG. 5 is a perspective view of the formed plastic piece applied to the slit of the spring sleeve.

DETAILED DESCRIPTION OF PREFERRED EMBODIMENTS OF THE INVENTION

Figure 6:
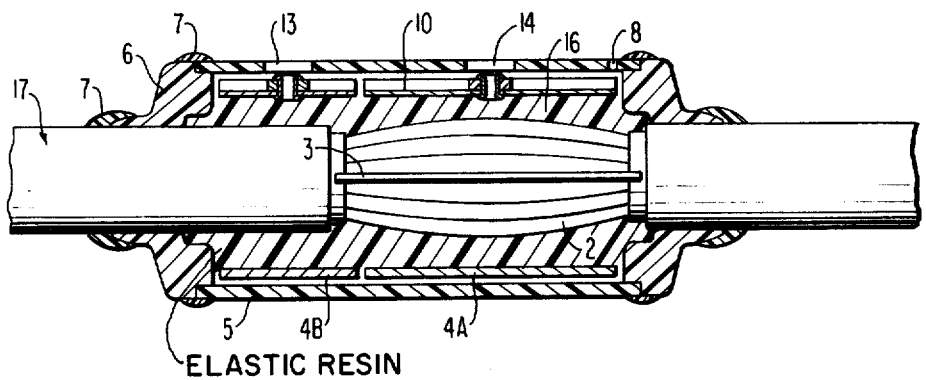
FIG. 6 is the same view as the FIG. 1 of another embodiment of this invention.

Preferred embodiments of the invention will now be described with reference to the drawings.

Referring initially to FIG. 1, suitable both for the gas plug and for the gas separator, about 120 mm of the intermediate sheath (1) of a polyethylene insulated communicating cable (outer sheath diameter about 45 mm) having a conductor wire (2) bundle with a diameter of 0.4 mm is peeled off, the protective tapes wound on the bundle of the insulated conductor wires (2) are removed and the insulated conductor wire bundle (cable core) (2) exposed. The cut-out metal sheaths (1b) of the assembly are connected by a copper wire (3).

The cut-out part of the cable thus formed and both end zones of the sheath (1) are covered with a polyethylene outer sleeve (5) having a thickness of 3 mm and including therein a central spring sleeve (4A) having a 100 mm length and a pair of side spring sleeves (4B) each having a 50 mm length. Each of spring sleeves (4A) and (4B) are made from spring steel having a thickness of 2.5 mm and each has a longitudinal slit (which cannot be shown in FIG. 1). The polyethylene outer sleeve is fixed to the sheath surfaces using a pair of spacer means (6), molded out of polyethylene, by welding the jointed parts (7) with melted polyethylene tape. This welding can be conducted at about 150°–180° C.

An air outlet hole (8) is provided in the outer sleeve. The outer diameters of the spring sleeves (4A) and (4B) are about 5 mm smaller than the inner diameter of the outer sleeve (5), but they can be expanded to have a diameter by inserting the small spacer piece (9) into the slit, as shown in the FIG. 3 where the sleeves are generally represented by 4. The small spacer piece (9) is made from a square steel sheet having a width of 16 mm and a center hole, and is fixed on a slender brass piece (10) having a thickness of 0.5 mm by an eyelet (11), as shown in the FIG. 4. The small spacer piece (9) fixed on the slender brass piece (10) is inserted in the slit of the spring sleeve. The brass piece (10), which remains inside the spring sleeve after the completion of the dam forming operation, serves to prevent resin from filling the slit and to assure the contraction of the spring sleeve otherwise hindered by the resin squeezed out into the slit when the spacer piece (9) is removed. A foamed plastic piece (12) is put in the slit as shown in FIG. 5 to prevent the filling of the resin in the slit during the pouring of the resin.

A resin (16) composed of 100 weight parts of urethane prepolymer and 80 weight parts of polyoxypropylene glycol (molecular weight 2,000) which have been mixed well is poured into the sleeve under a pressure of 100 – 200 g/cm$^2$ (G) through inlet hole (13) on the polyethylene outer sleeve 5. Meanwhile, the holes (13) (14) and (15), through which the small spacer pieces (9) are removed, are temporarily sealed by a rubber sheet.

After about 600 – 1,000 cc of the resin composition (16) overflows from the outlet hole (8), the outlet hole (8) is temporarily sealed by a rubber sheet and the sleeve was kept in that state for about 10 minutes, applying a pressure of 1.0 – 1.5 Kg/cm$^2$ (G) at room temperature to the resin. Thus, the resin is filled in the interior of the sleeve and penetrates into the spaces between the twisted conductor wires. The compressing time changes with the number of conductor wires and the diameter of the wires, but is usually 5 – 10 minutes for a cable having a wire diameter of 0.32 – 0.9 mm and from 100 to 2,500 wires.

The resin composition (16) filled in the sleeve (5) and penetrated in the spaces is fully set to have the desired hardness by standing for 5 hours at 20° C at atmospheric pressure.

After the resin is set, the small spacer pieces (9) and the eyelets (11) are removed from the spring sleeves (4) through the resin inlet hole (13) and the holes (14) and (15), and these holes and the resin outlet hole (8) are sealed or clogged by applying thereto melted polyethylene tape or polyethylene caps.

The air tight dam thus formed was subjected to gas permeability tests arter applying the following repeated heat cycles and the mechanical osscilations to the air tight dam. The gas permeability of the air tight dam was indicated by the number of heat cycles and osscilation when N$_2$ gas began to pass through the air tight dam. One heat cycle:

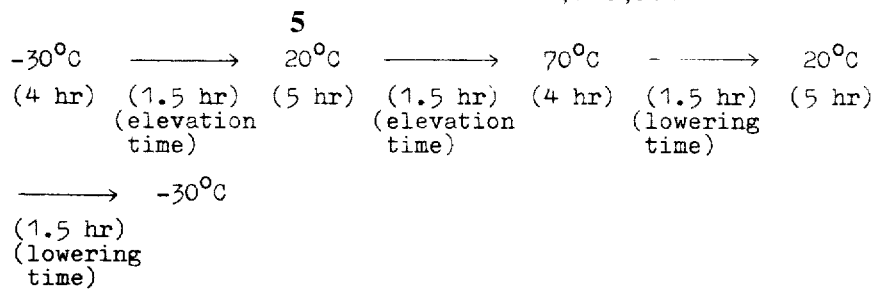

mechanical osscilations:
frequency 600/min.; amplitude ±10 mm.

The air tight dam according to this invention became gas permeable after being subjected to more than 100 heat cycles or more than 1,000,000 mechanical osscilations, while conventional air tight dams became gas permeable after being subjected to only about 10 heat cycles or about 100,000 mechanical osscilations. The $N_2$ was introduced at the end of the cable and the pressure of the $N_2$ gas used for the gas permeability test was 1 Kg/cm$^2$(G).

It will be apparent from the gas permeability tests that the air tight dam according to this invention is far more excellent than conventional ones.

The width of the slit of the spring sleeve while it was subjected to the heat cycle changed with the temperature, for example, it was 15 mm at 20° C, 17 mm at 70° C, and 13 mm at −30° C for the side spring sleeve (4B) on the cable sheath; 14 mm at 20° C, 17 mm at 70° C and 11 mm at −30° C for the central spring sleeve (4A) on the conductor body. The thermal expansion coefficient of the spring sleeve over the cable sheath zone and of that over the insulated conductors zone turned out to be different from each other.

Accordingly, a single spring sleeve covering the insulated conductors zone and also the sheath zone is not suitable, so that the compression applied to the insulated conductors zone becomes reduced in the lower temperature range to cause a breaking of the air tightness. The compressive pressure applied on the filled resin by the spring sleeves, measured with pressure sensers embedded in the resin, is about 3 Kg/cm$^2$, which is about three times that of the test gas pressure of 1 Kg/cm$^2$.

After the gas permeability test, the air tight dam was taken apart, and the length of the twisted conductor wire over which the resin was impregnated measured. The viscosity of the resin before setting the the hardness of the resin after setting were also measured. The length of the resin penetration through the cable from the peeled off opening end of the cable sheath was 50 cm; the viscosity of the resin before setting was 3,000 centipoise, the hardness (the penetration according to JIS-K-2530) after setting was 4 mm/100 g.5 sec.

The air tight dam shown in the FIG. 6 (in which the reference numerals are as in FIG. 1) is another example of a compact air tight dam suitable for the gas plug according to this invention, which is provided in the connecting zone between the communication cable containing compressed gas and one free of compressed gas. Accordingly, a spring sleeve is not provided on the sheath of the latter cable.

Figure 7:
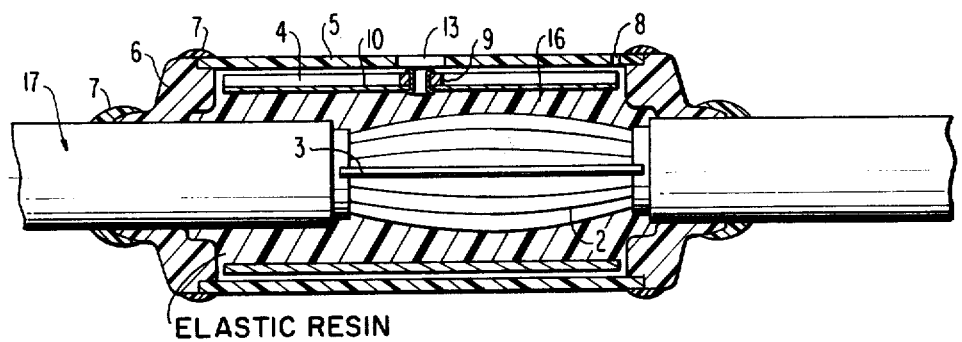
FIG. 7 is the same view as the FIG. 1 of another embodiment of this invention.

Another example of a compact air tight dam, suitable for the gas plug, is shown in the FIG. 7 (in which the reference numerals are as in FIG. 1), wherein a single spring sleeve is applied on both the cable sheath zone and the insulated conductor zone. Since the spring sleeve is located in a shifted position from the center of the opened zone of the sheath, the compressive function of the spring sleeve is not reduced.

Figure 8:
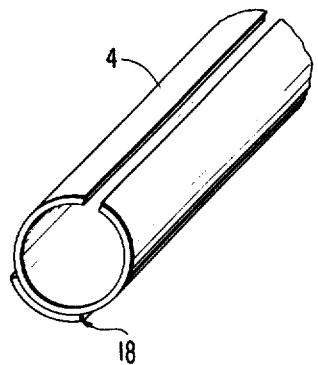
Figure 9:
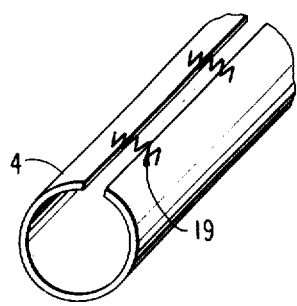
Figure 10:
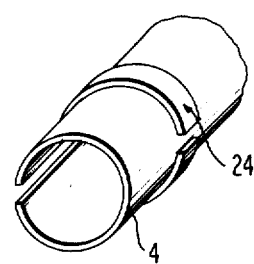

Another example of a spring sleeve (4) is shown in FIG. 8, wherein a back up sheath (18) is welded to the lower zone of the spring sleeve for reinforcing the latter; further example is shown in FIG. 9, wherein pluralities of springs (19) span the slit; yet another example is shown in FIG. 10, wherein a slit spring ring (24) is put on the spring sleeve so that both slits are located on mutually opposite positions on the sleeve.

While this invention has been described with reference to particular embodiments thereof, it will be understood that numerous modifications may be made by those skilled in the art without actually departing from the scope of the invention.

Therefore, the appended claim(s) is/are intended to cover all such equivalent variations as coming within the true spirit and scope of the invention.

What is claimed is:

1. A connecting zone connecting two insulated communication cables, each of said cables comprising an electrically insulating sheath surrounding a bundle of electrically insulated conductor wires, and providing an air tight connecting zone around the connection of the cables which comprises a polyethylene outer sleeve surrounding said connecting zone and fixed to each of said electrically insulating sheaths by a pair of spacer means welded to said insulating sheaths and to said outer sleeve, and inner spring sleeve means disposed inwardly of said polyethylene outer sleeve and surrounding the connection zone of the communication cables, said connecting zone being filled with a synthetic resin having a rubber-like elasticity.

2. The connecting zone of claim 1, wherein said outer sleeve and said inner spring sleeve means addditionally contain sealable inlets and outlets for filling said connecting zone with said resin permitting displacement of any air in said connecting zone during said filling.

3. The connecting zone of claim 2, wherein said inner spring sleeve means is a slit spring sleeve.

4. The connecting zone of claim 1, wherein said spring sleeve means comprises a slit spring sleeve having a plurality of springs bridging said slits permitting radial expansion and compression of said spring sleeve.

5. The connecting zone of claim 1 wherein said spring sleeve means comprises a slit spring sleeve and a slit spring ring surrounds said spring sleeve permitting radial expansion and compression of said spring sleeve, the slits of said slit spring sleeve means and of said slit spring ring being oppositely disposed.

6. The connecting zone of claim 1, wherein said inner spring sleeve means comprises a plurality of axially spaced inner spring sleeves.

7. The connecting zone of claim 6, wherein said inner spring sleeve means comprises a spring sleeve surrounding the insulating sheath of each of said communication cables and a central spring sleeve surrounding the connection of the bundle of insulating conductor wires.

* * * * *